No. 885,201. PATENTED APR. 21, 1908.
J. & J. H. STREET.
SHINGLE AND HEADING MACHINE.
APPLICATION FILED SEPT. 23, 1907.

2 SHEETS—SHEET 1.

WITNESSES:

INVENTORS,
Joseph Street,
and Joshua H. Street,
By Minturn Woerner
Attorneys.

No. 885,201. PATENTED APR. 21, 1908.
J. & J. H. STREET.
SHINGLE AND HEADING MACHINE.
APPLICATION FILED SEPT. 23, 1907.

2 SHEETS—SHEET 2.

WITNESSES:

INVENTORS
Joseph Street &
Joshua H. Street,
By Minturn & Woerner,
Attorneys.

UNITED STATES PATENT OFFICE.

JOSEPH STREET AND JOSHUA H. STREET, OF CHATTANOOGA, TENNESSEE.

SHINGLE AND HEADING MACHINE.

No. 885,201.

Specification of Letters Patent.

Patented April 21, 1908.

Application filed September 23, 1907. Serial No. 394,195.

*To all whom it may concern:*

Be it known that we, JOSEPH STREET and JOSHUA H. STREET, citizens of the United States, residing at Chattanooga, in the county of Hamilton and State of Tennessee, have invented certain new and useful Improvements in Shingle and Heading Machines, of which the following is a specification.

This invention relates to the mechanism in a shingle and heading machine for supporting and adjusting the cradle upon which the timber-bolt is received after each sawing and is re-set for the next cut.

Figure 1:
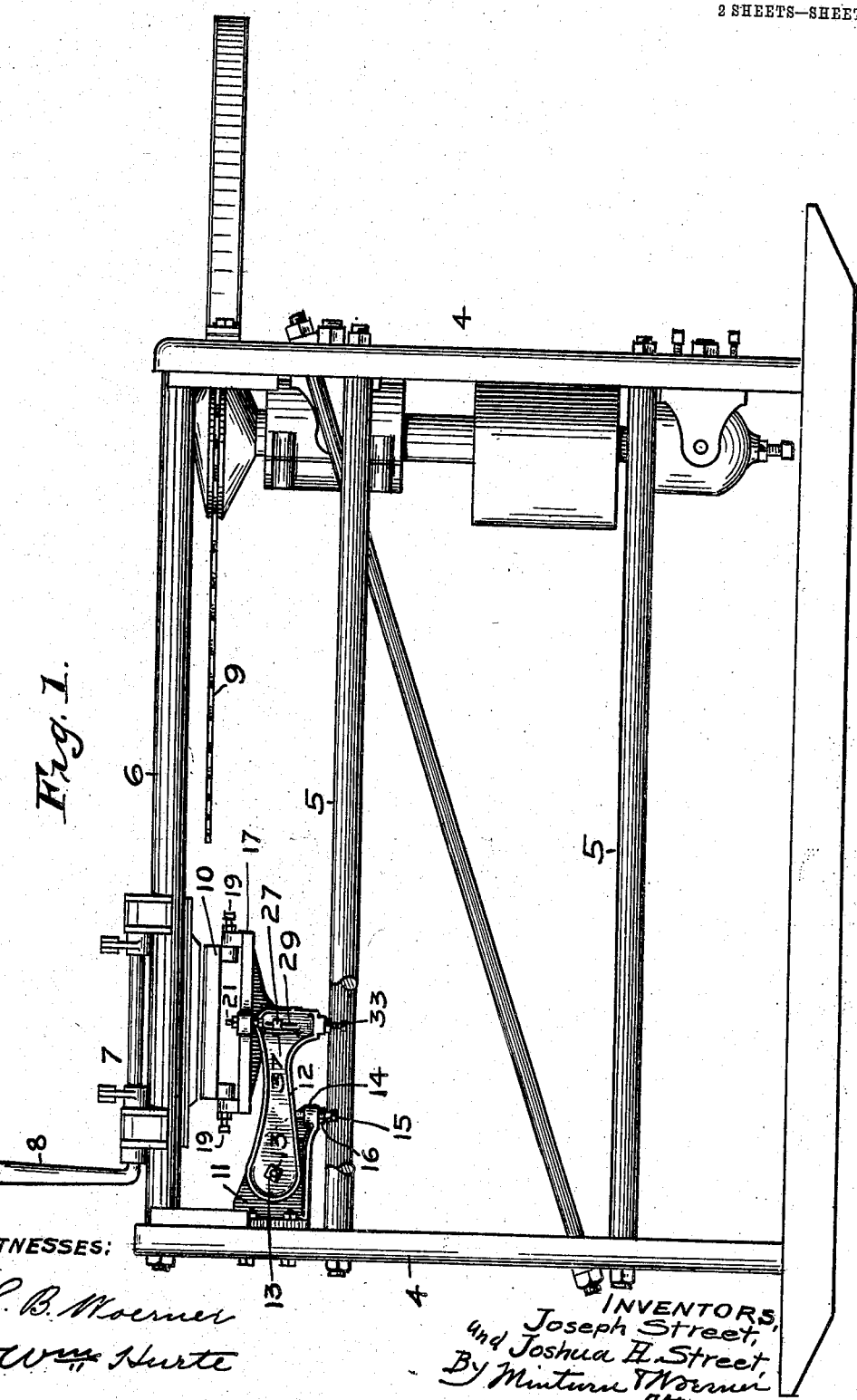
Figure 2:
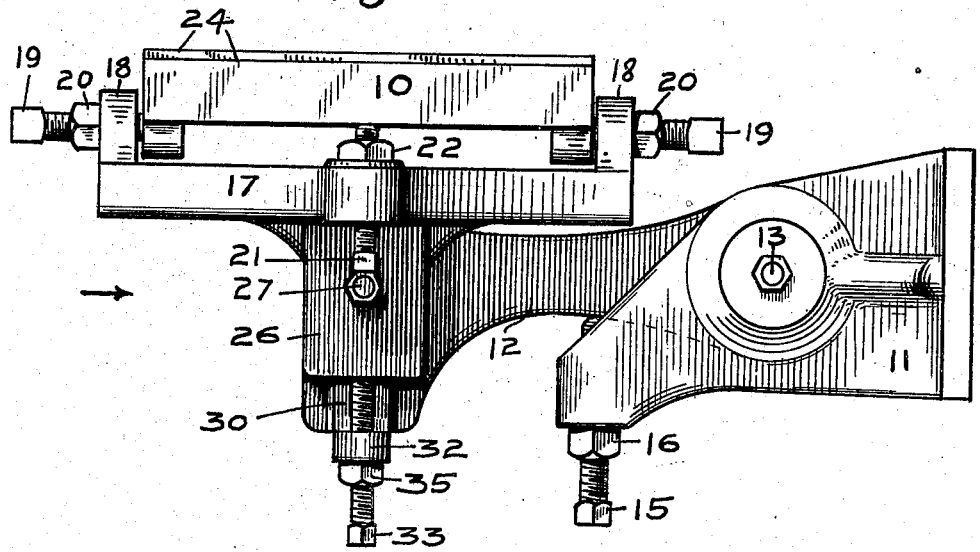
Figure 3:
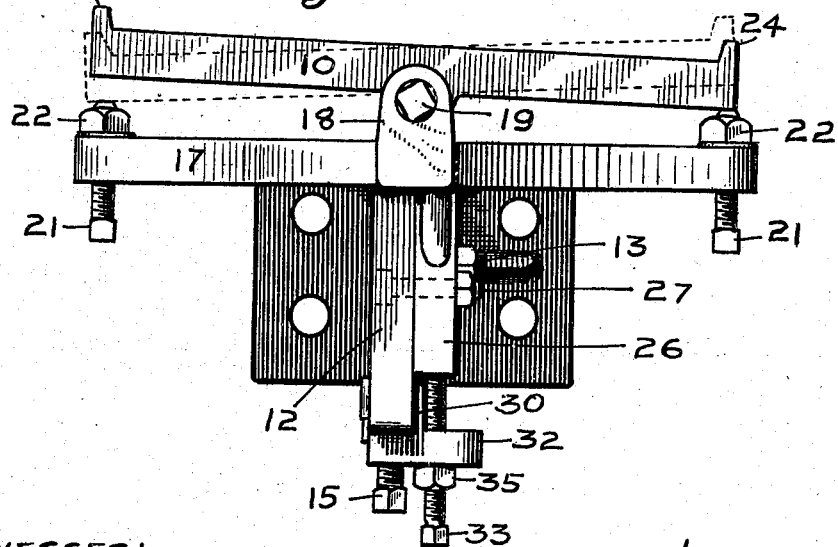

In the accompanying drawings which illustrate our invention—Figure 1 is a view in side elevation of a machine embodying our invention, a part of the machine being broken away to illustrate the parts beyond. Fig. 2 is a detail in elevation, viewed from the opposite side of the machine from that shown in Fig. 1, and Fig. 3 is a view in end elevation of the parts shown in Fig. 2 looking in the direction of the arrow in said Fig. 2.

Like characters of reference indicate like parts throughout the several views of the drawing.

4 represent the two end frames of the machine which are connected by means of the six horizontal shafts 5 and 6 arranged in triplicate on each side of the machine. Of these, the top shafts 6 form a track for the carriage 7 which holds and carries the material, that is the timber-bolt, which is to be sawed into shingles or heading. This carriage 7 may be of any suitable construction such for example as is shown and described in our application for patent for shingle and heading machine, filed October 4, 1906, Serial No. 337,464.

9 is a circular saw mounted at one end of the machine frame in a horizontal plane below the carriage 7, and the timber-bolt which is held by the carriage is brought into contact with the saw by the movement of the carriage longitudinally of the shafts 6, toward the saw center. After each shingle or heading is removed from the timber-bolt by the saw the carriage 7 is returned to the position shown in Fig. 1, whereupon the timber-bolt is released by a swinging movement of the lever 8, and drops by gravity down upon the cradle 10. The distance of the cradle 10 below the plane of saw 9 determines the thickness of the shingle or heading removed by the saw, and the angular adjustment of the cradle 10 with relation to the plane of the saw 9 determines whether the piece sawed off of the timber-bolt is of uniform thickness or is thicker at one edge than at its opposite edge and it determines the amount of variance between the thicknesses of the said edges.

The means for supporting the cradle and for determining its adjustment are of the essence of this invention and will now be described.

11 is a bracket which is bolted to the end 4 of the machine frame opposite that end of said frame in which saw 9 is mounted and 12 is an adjustable extension or arm of the bracket 11. It is pivotally secured or hinged to the bracket 11 by means of the bolt 13. The bracket 11 has a lateral lug 14 with a screw-threaded vertical hole in which the set screw 15 is operated so as to form a bearing for the arm 12. The arm 12 rests upon the upper end of the set screw 15, and the outer or free end of the arm 12 is raised or lowered by correspondingly screwing the set screw toward or from said arm, and any given adjustment will be retained by means of the lock-nut 16.

17 is a cradle-base having four arms arranged in two pairs at right angles to each other. One pair of these arms has the vertically extended end ears 18, between which ears the cradle 10 is pivotally secured by means of the bolts or screws 19. The screws 19 have lock-nuts 20 to keep the screws from working loose by a rocking movement of the cradle. The cradle 10 will be tilted or rocked on the set screws 19 within certain limits which will be prescribed by the set screws 21. The set screws 21 pass up through the ends of the other pair of arms of the cradle-base 17, and the vertically moving lower edges of the cradle 10 are adapted to contact with the upper ends of one or the other of said set screws 21 at each rocking movement or tilt of said cradle, and the extent of the tilt of the cradle will be determined by the amount of extension above the cradle-base of said set screws 21. It is obvious that both set screws 21 may be screwed into contact with the bottom of cradle 10 so as to altogether prevent the rocking or tilt of the cradle, and these screws can be so adjusted as to bring both tracks 24 of the cradle in a plane parallel with the plane of the saw 9 so that the section removed by the saw from the timber-bolt will be of uniform thickness. It is also obvious that by lowering the upper ends of set screws 21 from the position last described the cradle will be allowed to tilt in direct proportion, subject to the limitations of the device. Lock-nuts 22 are for the purpose of holding any given adjustment of the set screws 21.

Depending from the cradle-base 17 and formed as an integral part of said cradle-base is the clamping-plate 26 through which a transverse hole is formed for the reception of the bolt 27. This bolt 27 also passes through a vertical slot 29 in the end of the arm 12. This slotted end of the arm 12 is elongated vertically into a flat head for the purpose of increasing the clamping surface to contact with the clamping-plate 26. In order to prevent a rotary movement of the cradle-base 17 around the bolt 27, the expanded head of the arm 12 is provided, on the side which contacts with plate 26, with the rib extension 30, which makes a close sliding fit in a corresponding channel or groove in the plate 26.

At the lower end of the rib 30 is the lug 32 which extends in a lateral direction toward the plate 26, and is provided with a vertical screw-threaded hole to receive the set screw 33. The latter after passing through the lug 32 bears against the lower edge of the clamping-plate 26 and provides a means for carefully adjusting the position of said plate 26 with relation to the head in the end of arm 12. This adjustment raises and lowers the cradle-base and also the cradle 10 which is carried by said base. The lock-nut 35 enables a given adjustment to be retained. A flange 37 adjacent to and parallel with slot 29 serves as a lock to prevent the rotation of bolt 27 in said slot.

The jointing of the arm 12 to bracket 11 enables the cradle-base 17 to be placed in a horizontal or parallel position with relation to the plane of the saw, and this position will be retained by means of the set screw 16. Then the proper distance of the cradle below the plane of the saw 9 will be secured by means of the set screw 33. The tilt of the cradle will be determined by the set screws 21, as has been already described.

The cradle 10 will be tilted by hand in the proper direction each time that the carriage is drawn back.

Having thus fully described our invention what we claim as new and wish to secure by Letters Patent of the United States, is—

1. In a shingle and heading machine, a saw, a carriage carrying the material to be sawed having a reciprocating travel to and from the saw, a vertically adjustable horizontal arm, a cradle-base adjustable vertically on said arm, and a cradle pivotally mounted on the said cradle-base.

2. In a shingle and heading machine, a saw, a carriage carrying the material to be sawed having a reciprocating travel to and from the saw, a stationary bracket having a vertically adjustable extension, a cradle-base adjustable vertically on said bracket extension and a cradle pivotally mounted on said cradle-base whereby it may be tilted.

3. In a shingle and heading machine, a saw, a carriage carrying the material to be sawed having a reciprocating travel to and from the saw, a stationary bracket having a vertically adjustable extension, a cradle-base adjustable vertically on said bracket extension, a cradle pivotally mounted on said cradle-base whereby it may be tilted and means for determining the tilt movement of said cradle.

4. In a shingle and heading machine, a saw, a carriage carrying the material to be sawed, having a reciprocating travel to and from the saw, a stationary bracket, an arm extension pivotally secured to the bracket, a set screw carried by the bracket upon which the arm rests and by which it is adjusted vertically, a cradle-base adjustable vertically on said arm and a cradle pivotally mounted on said cradle-base.

5. In a shingle and heading machine, a saw, a carriage carrying the material to be sawed having a reciprocating travel to and from the saw, a stationary bracket having a vertically adjustable arm extension said arm having its outer end expanded to form a head and said head having a lateral and vertically extended rib, a cradle-base having a downwardly extended plate to contact with the ribbed side of said arm-head, said plate having a channel to receive the rib, means for clamping the plate and head together, means for adjusting the plate longitudinally of the rib, and a cradle pivotally mounted on said cradle-base whereby it may be tilted.

6. In a shingle and heading machine, a saw, a carriage carrying the material to be sawed having reciprocating travel to and from the saw, a bracket having an extension terminating in a flat expanded head, said head having a lateral rib, said head being slotted longitudinally of the rib, and said head having a laterally extended lug at the bottom of the rib, a set screw passing vertically through a threaded opening in said lug, a cradle-base having a downwardly extended plate to contact with the side of said head, said plate having a vertical groove in which the rib of said head makes a sliding fit, said plate bearing upon said set screw, a bolt passing through the plate and through the slot of said head, and a cradle pivotally mounted on said cradle-base whereby it may be tilted.

7. In a shingle and heading machine, a saw, a carriage carrying material to be sawed having reciprocating travel to and from the saw, a stationary bracket, an arm pivoted to said bracket, a set screw carried by the bracket bearing against the under side of the arm for the purpose of vertically adjusting the arm, said arm having its outer end expanded to form a head with a flat side, said flat side having a vertical rib, said head having a slot longitudinally of said rib and said head having a lateral lug, a set screw passing through a threaded opening in the lug said set screw having a lock-nut, a cradle-base having a downwardly extended plate to contact with the flat side of said arm-head, said plate having a groove in which the rib of the head makes a sliding fit, a bolt passing through the plate and through the slot in said head, a cradle pivotally mounted on said cradle-base so as to tilt on said pivots, and set screws on each side of the cradle-base under the rails of the cradle in the paths of the latter when tilted, said set screws being for the purpose of determining the tilting movement of the cradle, and means for locking a given adjustment of the set screws.

In witness whereof, we have hereunto set our hands and seals at Chattanooga, Tenn., this 17th day of September, A. D. one thousand nine hundred and seven.

JOSEPH STREET. [L. S.]
JOSHUA H. STREET. [L. S.]

Witnesses:
J. L. JOHNS,
WILLIAM STREET.